(12) United States Patent
Iyer et al.

(10) Patent No.: US 10,241,801 B2
(45) Date of Patent: Mar. 26, 2019

(54) METHOD AND APPARATUS TO CREATE REGISTER WINDOWS FOR PARALLEL ITERATIONS TO ACHIEVE HIGH PERFORMANCE IN HW-SW CODESIGNED LOOP ACCELERATOR

(71) Applicant: Intel Corporation, Santa Clara, CA (US)

(72) Inventors: Jayesh Iyer, Santa Clara, CA (US); Sergey P. Scherbinin, Obninsk (RU); Alexander Y. Ostanevich, Moscow (RU); Dmitry M. Maslennikov, Moscow (RU); Denis G. Motin, Moscow (RU); Alexander V. Ermolovich, Moscow (RU); Andrey Chudnovets, Moscow (RU); Sergey A. Rozhkov, San Jose, CA (US); Boris A. Babayan, Moscow (RU)

(73) Assignee: INTEL CORPORATION, Santa Clara, CA (US)

( * ) Notice: Subject to any disclaimer, the term of this patent is extended or adjusted under 35 U.S.C. 154(b) by 88 days.

(21) Appl. No.: 15/390,194

(22) Filed: Dec. 23, 2016

(65) Prior Publication Data

US 2018/0181405 A1    Jun. 28, 2018

(51) Int. Cl.
*G06F 9/302*     (2018.01)
*G06F 9/44*      (2018.01)
(Continued)

(52) U.S. Cl.
CPC .......... *G06F 9/3885* (2013.01); *G06F 9/3001* (2013.01); *G06F 9/3012* (2013.01);
(Continued)

(58) Field of Classification Search
CPC ...... G06F 9/325; G06F 9/3836; G06F 9/3885; G06F 9/3001; G06F 9/30058;
(Continued)

(56) References Cited

U.S. PATENT DOCUMENTS 5,941,977 A   8/1999  Panwar et al.
6,954,846 B2* 10/2005 Leibholz ............... G06F 9/3012
                                                    711/163
(Continued)

FOREIGN PATENT DOCUMENTS

WO    2014142704 A1   9/2014
WO    2015097494 A1   7/2015

OTHER PUBLICATIONS

Raman, et al., "Parallel-Stage Decoupled Software Pipelining," ACM, CGO'08, Apr. 5-10, 2008, 10 pages.
(Continued)

*Primary Examiner* — Daniel H Pan
(74) *Attorney, Agent, or Firm* — Nicholson De Vos Webster & Elliott LLP

(57) ABSTRACT

An apparatus includes a register file and a binary translator to create a plurality of strands and a plurality of iteration windows, where each iteration window of the plurality of iteration windows is allocated a set of continuous registers of the register file. The apparatus further includes a buffer to store strand documentation for a strand from the plurality of strands, where the strand documentation for the strand is to include an indication of a current register base for the strand. The apparatus further includes an execution circuit to execute an instruction to update the current register base for the strand in the strand documentation for the strand based on a fixed step value and an iteration window size.

22 Claims, 18 Drawing Sheets

(51) Int. Cl.
*G06F 9/38* (2018.01)
*G06F 9/30* (2018.01)
*G06F 9/32* (2018.01)
*G06F 8/41* (2018.01)

(52) U.S. Cl.
CPC ...... *G06F 9/30058* (2013.01); *G06F 9/30127* (2013.01); *G06F 9/30181* (2013.01); *G06F 9/384* (2013.01); *G06F 9/3851* (2013.01); *G06F 8/445* (2013.01); *G06F 8/4452* (2013.01); *G06F 8/452* (2013.01); *G06F 9/3009* (2013.01); *G06F 9/30065* (2013.01); *G06F 9/30123* (2013.01); *G06F 9/30138* (2013.01); *G06F 9/30141* (2013.01); *G06F 9/325* (2013.01); *G06F 9/381* (2013.01)

(58) Field of Classification Search
CPC ............. G06F 9/30061; G06F 9/30065; G06F 9/3009; G06F 9/3012; G06F 9/3017; G06F 9/30145; G06F 9/30123; G06F 9/30127; G06F 9/30134; G06F 9/30138; G06F 9/30141; G06F 9/30181; G06F 9/381; G06F 9/384; G06F 9/3851; G06F 8/4452; G06F 8/443; G06F 8/445; G06F 8/452
USPC ........ 712/203, 221, 236, 241; 717/150, 151, 717/156, 159, 161
See application file for complete search history.

(56) References Cited

U.S. PATENT DOCUMENTS

| | | | |
|---|---|---|---|
| 7,065,635 B1* | 6/2006 | Sugumar | G06F 9/30094 712/217 |
| 7,962,724 B1* | 6/2011 | Ali | G06F 9/3802 712/207 |
| 8,539,211 B2* | 9/2013 | Hoogerbrugge | G06F 9/3851 712/235 |
| 8,789,031 B2* | 7/2014 | Liu | G06F 8/433 717/149 |
| 2004/0133768 A1 | 7/2004 | Thimmannagari | |
| 2009/0150890 A1* | 6/2009 | Yourst | G06F 8/445 718/102 |
| 2010/0274972 A1* | 10/2010 | Babayan | G06F 9/3842 711/125 |
| 2013/0339711 A1 | 12/2013 | Kosarev et al. | |
| 2014/0281407 A1* | 9/2014 | Astigeyevich | G06F 9/30145 712/216 |
| 2015/0301831 A1 | 10/2015 | Iyer et al. | |
| 2016/0179549 A1 | 6/2016 | Xekalakis et al. | |

OTHER PUBLICATIONS

Extended European Search Report for Application No. 17205553.5, dated May 25, 2018, 10 pages.

* cited by examiner

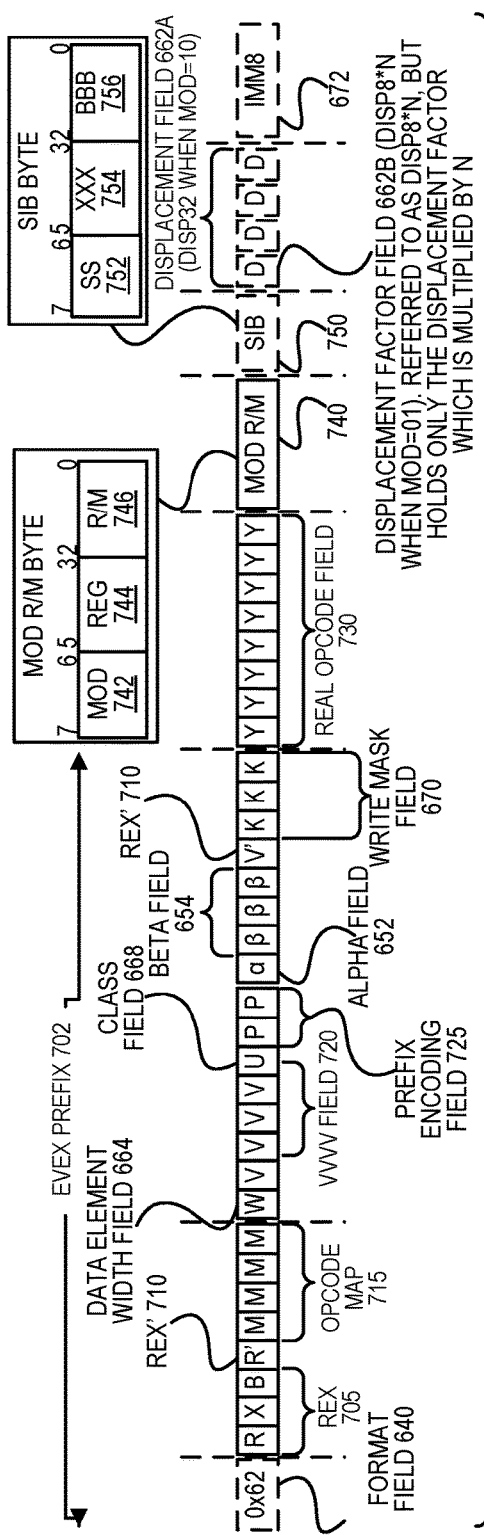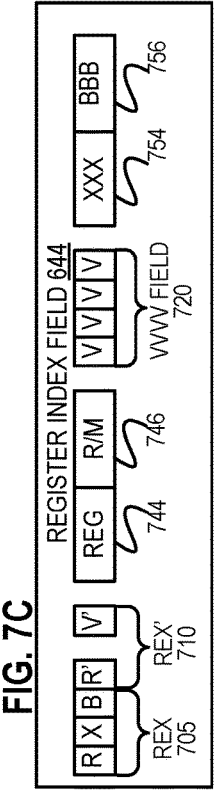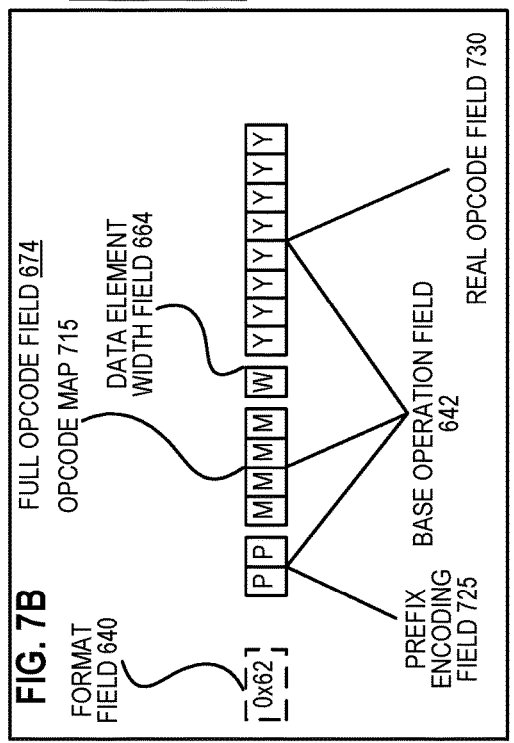

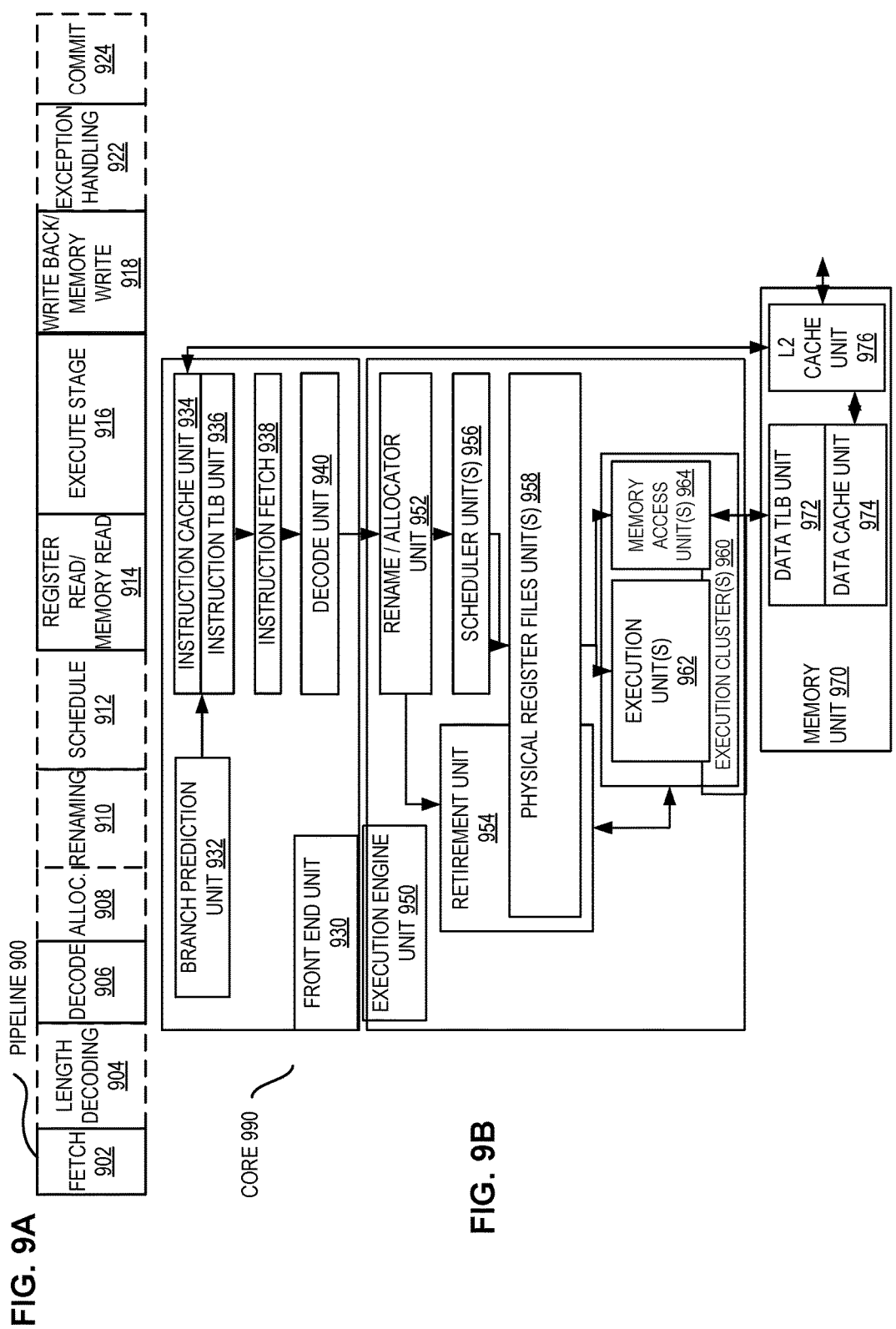

METHOD AND APPARATUS TO CREATE REGISTER WINDOWS FOR PARALLEL ITERATIONS TO ACHIEVE HIGH PERFORMANCE IN HW-SW CODESIGNED LOOP ACCELERATOR

TECHNICAL FIELD

Embodiments of the invention relate to the field of computing; and more specifically, to an efficient register allocation scheme for a multi-strand loop processor.

BACKGROUND

The presence of loops in program code is a source of significant amount of instruction-level Parallelism (ILP). In a superscalar architecture, loop parallelization is implemented through the combination of wide out-of-order execution and dynamic register renaming. For each iteration, the same instructions of the loop body are allocated into the scheduling window and a hardware renaming logic dynamically assigns new physical register addresses to logical register addresses encoded in the instructions. This allows overlapping execution of multiple loop iterations through out-of-order scheduling of instructions from different loop iterations, thereby exploiting inter-iteration parallelism inherent in loops.

A highly parallel strand-based architecture may be utilized to more efficiently exploit inter-iteration parallelism when compared to a superscalar architecture (exploit more ILP from loops in comparison to a superscalar architecture). In this approach for loop parallelization, multiple loop iterations are processed simultaneously via multiple strands, resulting in out-of-order fetch, allocation, and execution of instructions from different iterations. Thus, instructions of a particular iteration can be executed even if instructions of the previous iterations have not been fetched yet, which is impossible in a superscalar architecture due to in-order fetch and allocation. The dynamic register renaming technique used in superscalar architectures is not applicable or efficient in a highly parallel strand-based architecture due to out-of-order instruction fetch and allocation, as well as the need to support a much larger execution width (which is made possible by processing multiple loop iterations in parallel) than practical renaming hardware can afford.

BRIEF DESCRIPTION OF THE DRAWINGS

The invention may best be understood by referring to the following description and accompanying drawings that are used to illustrate embodiments of the invention. In the drawings:

FIG. 6A is a block diagram illustrating a generic vector friendly instruction format and class A instruction templates thereof according to embodiments of the invention;

FIG. 6B is a block diagram illustrating the generic vector friendly instruction format and class B instruction templates thereof according to embodiments of the invention;

FIG. 7A is a block diagram illustrating an exemplary specific vector friendly instruction format according to embodiments of the invention;

FIG. 7B is a block diagram illustrating the fields of the specific vector friendly instruction format 700 that make up the full opcode field 674 according to one embodiment of the invention;

FIG. 7C is a block diagram illustrating the fields of the specific vector friendly instruction format 700 that make up the register index field 644 according to one embodiment of the invention;

FIG. 9A is a block diagram illustrating both an exemplary in-order pipeline and an exemplary register renaming, out-of-order issue/execution pipeline according to embodiments of the invention;

FIG. 9B is a block diagram illustrating both an exemplary embodiment of an in-order architecture core and an exemplary register renaming, out-of-order issue/execution architecture core to be included in a processor according to embodiments of the invention;

FIG. 10A is a block diagram of a single processor core, along with its connection to the on-die interconnect network 1002 and with its local subset of the Level 2 (L2) cache 1004, according to embodiments of the invention;

FIG. 10B is an expanded view of part of the processor core in FIG. 10A according to embodiments of the invention;

FIG. 12 shown a block diagram of a system in accordance with one embodiment of the present invention;

FIG. 13 is a block diagram of a first more specific exemplary system in accordance with an embodiment of the present invention;

FIG. 14 is a block diagram of a second more specific exemplary system in accordance with an embodiment of the present invention;

FIG. 15 is a block diagram of a SoC in accordance with an embodiment of the present invention.

DETAILED DESCRIPTION

Figure 1:
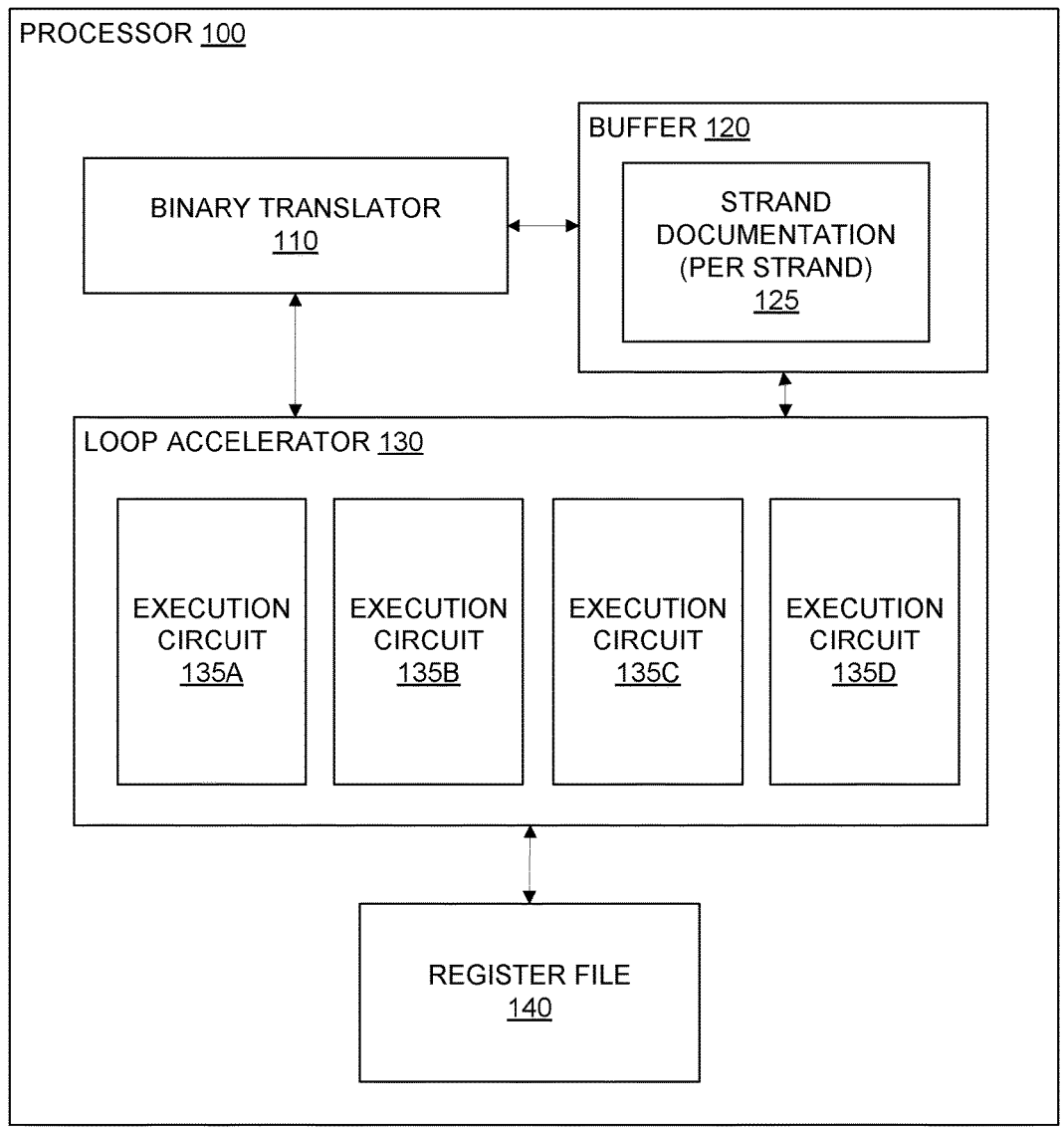
FIG. 1 is a diagram illustrating a processor that implements a register allocation scheme for highly parallel strand-based architectures, according to some embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, a strand or micro-thread is a sequence of instructions arranged by a binary translator (e.g., at program compilation time for the hot loops identified), where instructions belonging to the same strand or micro-thread are to be executed by the hardware in-order.

As used herein, a multi-strand out-of-order loop processor (sometimes referred to herein simply as a multi-strand loop processor or loop accelerator) is an accelerator that processes multiple strands or micro-threads created by a binary translator in parallel such that: (1) instructions of a strand or micro-thread may be fetched, issued, and executed out of program order with respect to instructions of different strands or micro-threads and (2) all but memory and interruptible instructions may be committed (retired) out of program order.

The presence of loops in program code is a source of a significant amount of instruction-level parallelism (ILP). In order to take advantage of existing ILP opportunities inherent in loops, different registers should be allocated to the same instruction being executed for different iterations of a loop in parallel. Otherwise, instructions must wait until the previous loop iteration has finished executing and for the registers allocated to instructions in that iteration to be freed. Thus, loop iterations will not be overlapped in execution and would have to be processed strongly in-order.

Conventional superscalar architectures attempt to address this issue by utilizing a dynamic register renaming technique. However, this approach requires in-order allocation of instructions, which prevents the effective overlapping execution of loop iterations. In addition, the throughput of a hardware renamer can become a bottleneck because it can become very complicated to rename registers of more than a few instructions per clock cycle.

Embodiments disclosed herein provide an efficient register allocation scheme that is applicable for highly parallel strand-based architectures. The register allocation scheme enables strands to communicate data through registers with other strands executing in parallel on the same loop iteration or different loop iterations. The register allocation scheme ensures that strands executing different loop iterations of the same loop part work with different registers to avoid overwriting values which might be used by other strands, thus keeping correct program semantics while allowing high levels of ILP.

An advantage of embodiments disclosed herein is that they enable aggressive ILP by allowing multiple iterations of a loop to execute simultaneously (in parallel) using different register sets without having to employ complex renaming logic. The underlying microarchitecture has the ability to execute loop iterations asynchronously with the help of a binary translator that places instructions into different strands or micro-threads that can be executed in parallel. This is in contrast to conventional superscalar architectures, which place instructions from different loop iterations into a single instruction stream, thereby making loop iterations synchronized and dependent on each other. Other advantages will be apparent to one having ordinary skill in the art from the disclosure provided herein.

FIG. 1 is a diagram illustrating a processor that implements a register allocation scheme for highly parallel strand-based architectures, according to some embodiments. As shown in the diagram, the processor 100 includes a binary translator 110, a buffer 120, a loop accelerator 130, and a register file 140. The binary translator 110 translates program code (e.g., x86 binary) into code that can be run on the loop accelerator 130. The binary translator 110 may perform static analysis of the program code to identify any loops in the program code. Based on this static analysis, the binary translator 110 may decompose the loops in the program code into one or more strands. A strand (which may also be referred to as a micro-thread) is a sequence of instructions arranged by the binary translator 110, where instructions belonging to the same strand are to be executed by hardware (e.g., loop accelerator 130) in-order. As will be described in additional detail below, multiple strands can be executed in parallel by the loop accelerator 130 to accelerate loop execution, where instructions from different strands may be executed out-of-order. The binary translator 110 may create strands based on the characteristics of the loops in the program code. For example, the binary translator 110 may create strands such that dependent instructions (e.g., dependent on register or memory) are placed in the same strand as other instructions they depend upon, while independent instructions are placed in separate strand. This allows the strand with the independent instructions to make progress even if the strand with the dependent instructions is stalled (e.g., because it is waiting for a memory access operation to complete).

In one embodiment, the binary translator 110 is communicatively coupled to a buffer 120 that stores strand documentation 125. In one embodiment, the buffer 120 stores strand documentation 125 for each strand (per strand). The strand documentation 125 for a strand includes information regarding the properties of the strand. Although the buffer 120 is shown in the diagram as being a single buffer 120 that includes strand documentation 125 for all strands, it should be understood that other embodiments may provide a separate (hardware) buffer 120 per strand that is to store strand documentation 125 for that strand. In one embodiment, the strand documentation 125 for a strand includes an indication of an instruction pointer for the strand. The instruction pointer for a strand indicates the current instruction being executed by the strand (or the next instruction to be executed by the strand, depending on implementation). The strand-based architecture thus employs multiple instruction pointers (one per strand), which is in contrast to a typical superscalar processor that only employs a single instruction pointer. In one embodiment, the strand documentation 125 for a strand includes an indication of an iteration number for the strand. The iteration number for the strand indicates the current loop iteration that is being executed by the strand. In one embodiment, the strand documentation 125 for a strand includes an indication of a loop exit counter for the strand. The loop exit counter for the strand allows detection of a counted exit. In one embodiment, the strand documentation 125 for a strand includes an indication of a register base for the strand. The register base for the strand indicates the set of registers that the strand can work with for the current loop iteration being executed by the strand. The strand documentation 125 for a strand may thus contain information that defines the current execution of the strand (e.g., which instruction is being executed, which iteration within the loop is being executed, and which registers the strand can work with). As such, different strands can execute the same program code (e.g., code within a loop body) in parallel, but for different loop iterations, depending on the contents of the strand documentation 125.

The binary translator 110 is communicatively coupled to the loop accelerator 130 and may provide strands to the loop accelerator 130 for execution. The loop accelerator 130 is a hardware component that is dedicated for accelerating loop execution. The loop accelerator 130 includes multiple execution circuits 135 (execution circuits 135A-D) to process multiple strands in parallel. As shown in the diagram, the loop accelerator 130 includes four execution circuits 135. As such, this loop accelerator 130 is able to process four strands in parallel. However, it should be understood that the loop accelerator 130 can include more or less execution circuits 135 than shown in the diagram. The loop accelerator 130 executes instructions belonging to the same strand sequentially (in-order). However, the loop accelerator 130 may execute instructions belonging to different strands non-sequentially (out-of-order) as long as there are no dependencies between them that prevent such parallelization. The loop accelerator 130 is communicatively coupled to the buffer 120. The loop accelerator 130 may access and update strand documentation 125 stored in the buffer 120 when processing a strand (e.g., to update the current state of execution of the strand). The loop accelerator 130 is also communicatively coupled to a register file 140 that includes multiple registers. The loop accelerator 130 (and more specifically, the execution circuits 135 of the loop accelerator 130) may work with the registers of the register file 140 when executing instructions.

As mentioned above, in order to take advantage of existing ILP opportunities inherent in loops, different registers should be allocated to the same instruction being executed for different iterations of a loop in parallel. Otherwise, instructions must wait until the previous loop iteration is finished executing and for the registers to be freed. Thus, loop iterations will not be overlapped in execution and be processed strongly in-order. In one embodiment, the binary translator 110 statically allocates separate register file 140 areas or partitions for different loop iterations that are planned to be executed simultaneously. These separate register file 140 areas or partitions are referred to herein as iteration windows. In one embodiment, the binary translator 110 determines the number of loop iterations that can be executed in parallel (based on the resources available) and creates as many iteration windows as the number of loop iterations that can be executed in parallel. Each iteration window includes a set of continuous registers of the register file 140 that can be utilized for executing a given loop iteration. In one embodiment, when the binary translator 110 creates the strands, the binary translator 110 initially assigns a particular iteration window to each strand (e.g., by initializing the register base in strand documentation 125). As will be described in additional detail below, creating a separate iteration window for each loop iteration allows multiple iterations of a loop to execute simultaneously (in parallel) on different register sets without employing complex register renaming logic.

Figure 2:
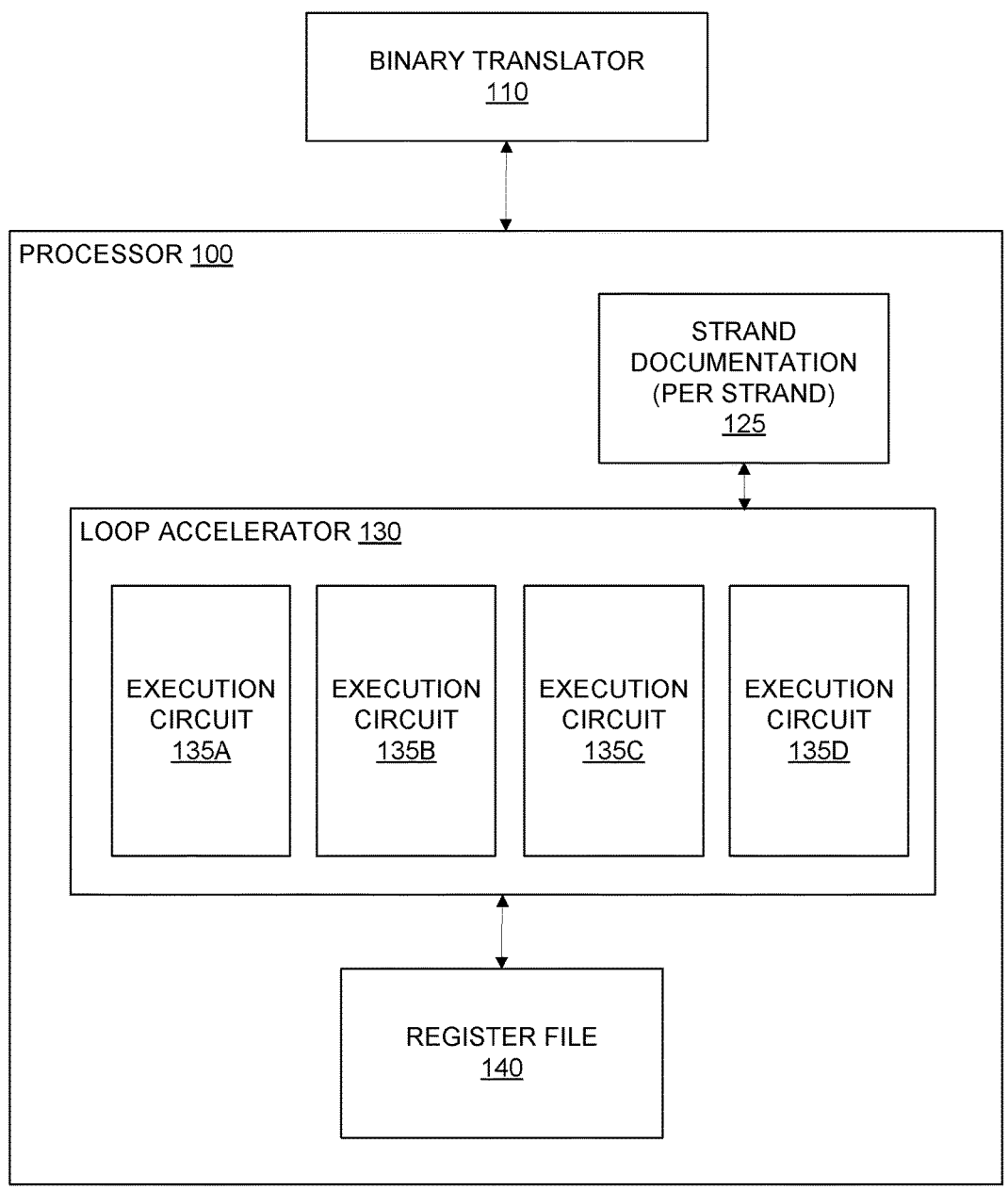
FIG. 2 is a diagram illustrating a system that implements a register allocation scheme for highly parallel strand-based architectures, according to some embodiments.

FIG. 2 is a diagram illustrating a system that implements a register allocation scheme for highly parallel strand-based architectures, according to some embodiments. The system has similar components as the processor 100 shown in FIG. 1, except that the binary translator 110 is implemented external to the processor (e.g., as a software implementation). It should be understood that the arrangement of components shown in the diagrams is provided by way of example and not limitation. Different embodiments may employ a different arrangement of components than shown in the diagrams.

Figure 3:
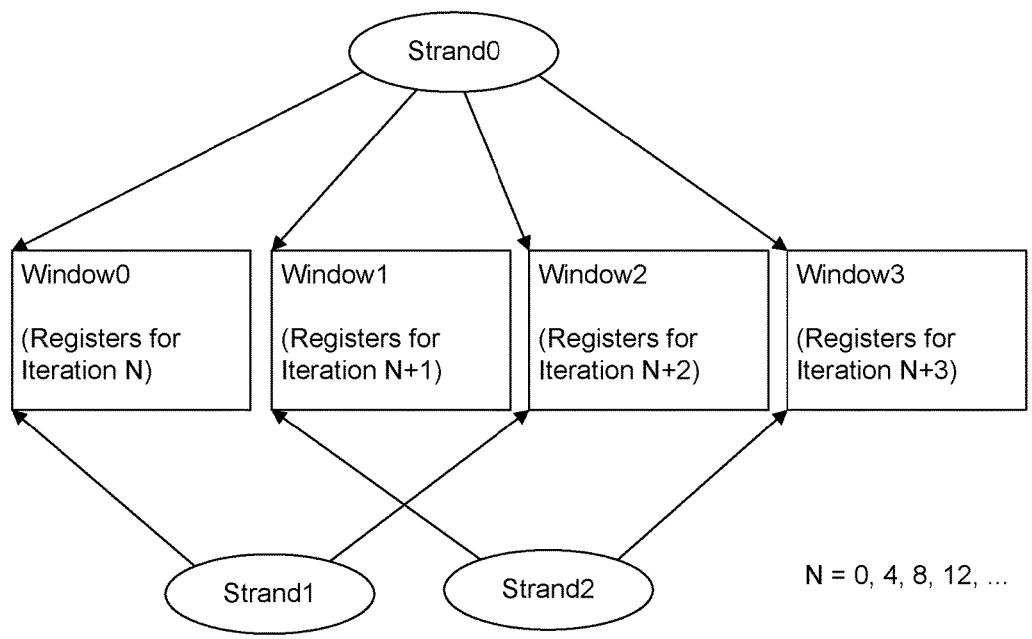
FIG. 3 is a diagram illustrating a configuration of iteration windows, according to some embodiments.

FIG. 3 is a diagram illustrating a configuration of iteration windows, according to some embodiments. As an example, in one embodiment, the binary translator 110 creates four iteration windows so that four loop iterations (iterations N, N+1, N+2, and N+4) can execute in parallel, where N=0, 4, 8, 12 . . . . The iteration windows are labeled as window0, window1, window2, and window3. For sake of illustration, in this example, it is assumed that the register file 140 has 40 registers (registers R0-R39), and the binary translator 110 allocates ten registers to each iteration window. For example, registers R0-R9 are allocated to window0, registers R10-R19 are allocated to window1, registers R20-R29 are allocated to window2, and registers R30-R39 are allocated to window3.

With this exemplary configuration of iteration windows, the registers allocated to window0 are used for executing loop iterations 0, 4, 8, etc., the registers allocated to window1 are used for executing loop iterations 1, 5, 9, etc., the registers allocated to window2 are used for executing loop iterations 2, 6, 10, etc., and the registers allocated to window3 are used for executing loop iterations 3, 7, 11, etc. Loop iteration 0 is referred to herein as iteration0, loop iteration 1 is referred to herein as iteration1, loop iteration 2 is referred to herein as iteration2, and so on.

The binary translator 110 also designates the strands that are to execute instructions in the loop iterations. In this example, there are three strands (labeled as strand0, strand1, and strand2). As shown in the diagram (by the arrows stemming from the respective strands), strand0 executes every iteration of the loop and thus it works with registers allocated to window0, window1, window2, or window3, depending on which loop iteration it is executing. Strand1 executes even loop iterations (e.g., loop iterations 0, 2, 4, 6, etc.) and thus it works with registers allocated to window0 or window2, depending on which loop iteration it is executing. Similarly, strand2 executes odd loop iterations (e.g., loop iterations 1, 3, 5, 7, etc.) and thus it works with registers allocated to window1 or window 3, depending on which loop iteration it is executing.

The binary translator 110 initially sets the appropriate register base for each strand in the strand documentation 125 for the strand (e.g., in the buffer 120). The first loop iteration to be executed by strand0 and strand1 is iteration0. As such, the binary translator 110 initially sets the register bases for strand0 and strand1 to 0 (indicating the beginning of window0 or register R0). The first loop iteration to be executed by strand2 is iteration1. As such, the binary translator 110 initially sets the register base for strand2 to 10 (indicating the beginning of window1 or register R10). This configures strand0 and strand1 to work with the registers allocated to window0 (registers R0-R9) and configures strand2 to work with the registers allocated to window1 (registers R10-R19).

Each strand switches to a new iteration window when it takes a backward branch to the next loop iteration (e.g., based on executing a backward branch instruction inserted by the binary translator 110). This is achieved by updating the register base for the strand in the strand's strand documentation 125. In one embodiment, the register base is updated by incrementing the current register base by a certain amount (and then modulo the size of the entire register area of the register file 140 allocated for the loop to cause wrap-around). For example, as mentioned above, strand0 executes all loop iterations. This means that once strand0 finishes executing iteration0, it proceeds to execute iteration1. As such, strand0 is said to have a fixed step value of 1 (add 1 to the current iteration number to get the next iteration number). In one embodiment, the fixed step value is updated/provided by a backward branch instruction. The fixed step value is multiplied by the iteration window size (which corresponds to the number of registers in an iteration window) to obtain the increment amount (or the shift value). In one embodiment, the strand documentation 125 for a strand includes an indication of the iteration window size. The current register base is then incremented by the increment amount (or shift value) to obtain the updated register base. In this example, the updated register base for strand0 is thus 10 (current register base (0)+fixed step (1)*iteration window size (10)=10). As a result, when strand0 executes its next loop iteration (iteration1), it works with registers in window1 (registers R10-R19). Strand1 and Strand2 execute alternate loop iterations and thus have a fixed step value of 2 (add 2 to the current iteration number to get the next iteration number). When strand1 completes executing iteration0, the register base for strand1 is updated in a similar manner as done for strand0 as follows: updated register base=current register base (0)+fixed step (2)*iteration window size (10)=20. As a result, when strand1 executes its next loop iteration (iteration2), it works with registers in window2 (registers R20-R29). When strand1 completes executing iteration2, the register base for strand1 is updated again as follows: updated register base=current register base (20)+fixed step (2)*iteration window size (10)=40. In this example, wrap around would come into effect (by calculating 40 modulo the total number of registers allocated (40)=0) and thus the updated register base is determined to be 0. As a result, when strand1 executes its next loop iteration (iteration4), it works with registers in window0. The register base for strand2 is updated in a similar manner. For example, when strand2 completes executing iteration1, the register base for strand2 is updated as follows: updated register base=current register base (10)+fixed step (2)*iteration window size (10)=30. As a result, when strand2 executes its next loop iteration (iteration3), it works with registers in window3 (registers R30-R39). When strand2 completes executing iteration3, the register base for strand2 is updated again as follows: updated register base=current register base (30)+fixed step (2)*iteration window size (10)=50. In this example, wrap around would come into effect (by calculating 50 modulo the total number of registers allocated (40)=10) and thus the new register base is determined to be 10. As a result, when strand2 executes its next loop iteration (iterations), it works with registers in window1. In this manner, whenever a strand moves on to executing another loop iteration (based on executing a backward branch instruction), the register base for the strand is updated to indicate the iteration window that the strand can work with for executing that loop iteration.

In one embodiment, the binary translator 110 only encodes the virtual register number or the register offset when specifying a register (e.g., when generating instructions in a strand). Depending on the loop iteration being executed, the actual physical register value is determined at the time of allocation by adding the current register base for the strand (e.g., from its strand documentation 125) to the register offset. For example, when strand0 is executing iteration0 and the strand executes an instruction which has a destination register encoded with a register offset of 0, since the current register base for strand0 is 0, the physical register written by this instruction is R0 (current register base (0)+register offset (0)=0). However, when strand0 executes iteration1, its register base is updated to 10, and thus when the strand executes the same instruction it would write to R10 (current register base (10)+register offset (0)=10). In this way, the registers are "renamed" with a simple adder (that adds the register base for the strand to the register offset provided by the instruction), without the need for complex renaming logic.

Communication among different strands executing different parts of the same loop iteration only use the registers of the iteration window for that loop iteration. In one embodiment, in the case of a recurrent loop, communication between different loop iterations may be performed by accessing a register in the iteration window of another loop iteration by encoding the corresponding register offset relative to the current register base (e.g., the beginning of the current iteration window). In one embodiment synchronization of register usage is implemented through a scoreboard technique.

Figure 4:
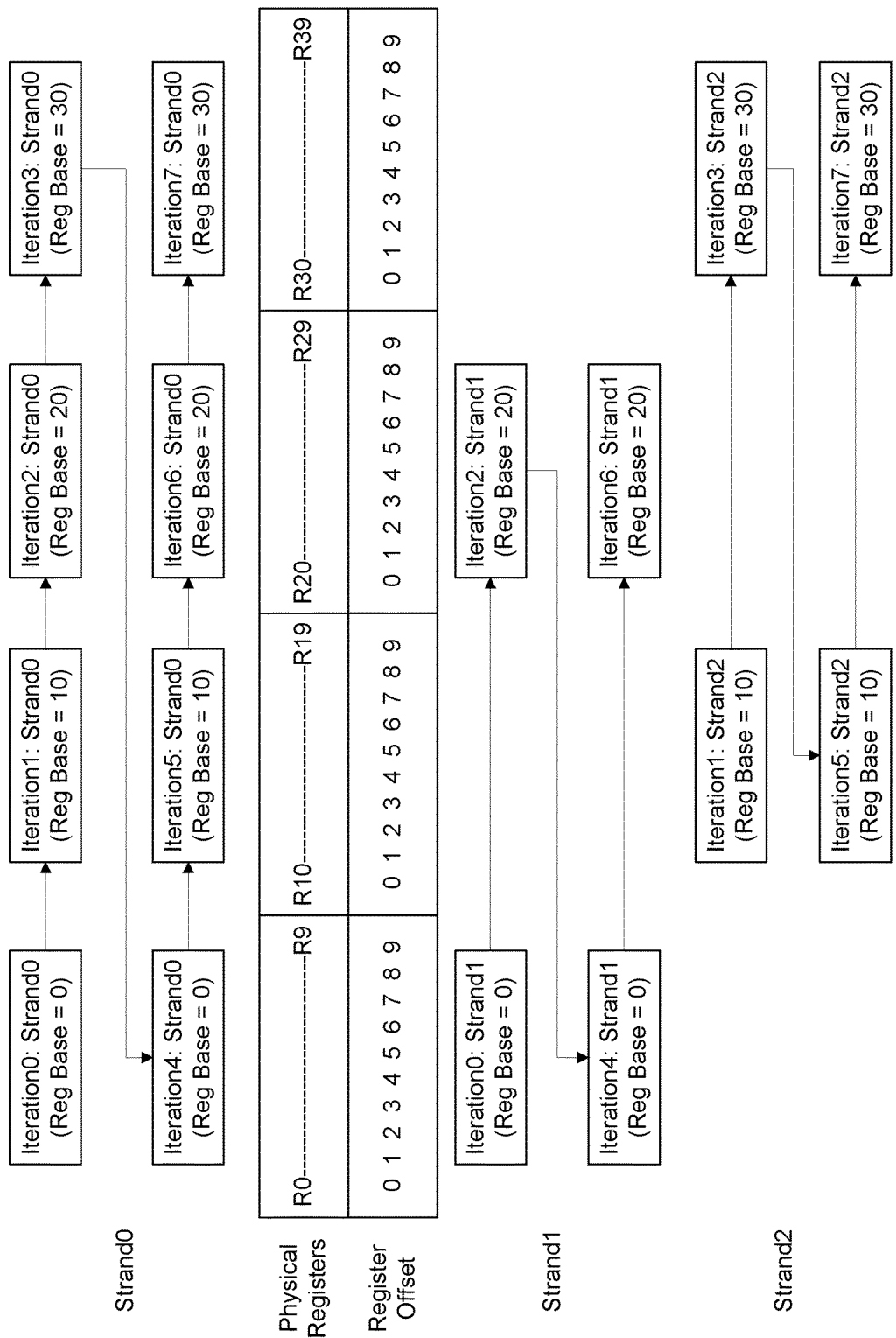
FIG. 4 illustrates the workings of register allocation scheme through setting of register base for strands at different points of execution, according to some embodiments.

FIG. 4 illustrates the workings of register allocation scheme through setting of register base for strands at different points of execution, according to some embodiments. Continuing with the example provided above, as shown in the diagram, strand0 executes every iteration of the loop (this example shows the loop having 8 iterations (iteration0-iteration7)). When strand0 executes iteration0 its register base is set to 0 and thus it works with registers R0-R9. When strand0 executes iteration1, its register base is set to 10 and thus it works with registers R10-R19. When strand0 executes iteration2, its register base is set to 20 and thus it works with registers R20-R29. When strand0 executes iteration3, its register base is set to 30 and thus it works with registers R30-R39. When strand0 executes iteration4, its register base is set to 0 and thus it works with registers R0-R9. When strand0 executes iteration5, its register base is set to 10 and thus it works with registers R10-R19. When strand0 executes iteration6, its register base is set to 20 and thus it works with registers R20-R29. When strand0 executes iteration7, its register base is set to 30 and thus it works with registers R30-R39. As shown in the diagram, strand 1 executes every even iteration of the loop. When strand1 executes iteration0, its register base is set to 0 and thus it works with registers R0-R9. When strand1 executes iteration2, its register base is set to 20 and thus it works with registers R20-R29. When strand1 executes iteration4, its register base is set to 0 and thus it works with registers R0-R9. When strand1 executes iteration6, its register base is set to 20 and thus it works with registers R20-R29. As shown in the diagram, strand2 executes every odd iteration of the loop. When strand2 executes iteration1, its register base is set to 10 and thus it works with registers R10-R19. When strand2 executes iteration3, its register base is set to 30 and thus it works with registers R30-R39. When strand2 executes iteration5, its register base is set to 10 and thus it works with registers R10-R19. When strand2 executes iteration7, its register base is set to 30 and thus it works with registers R30-R39.

Figure 5:
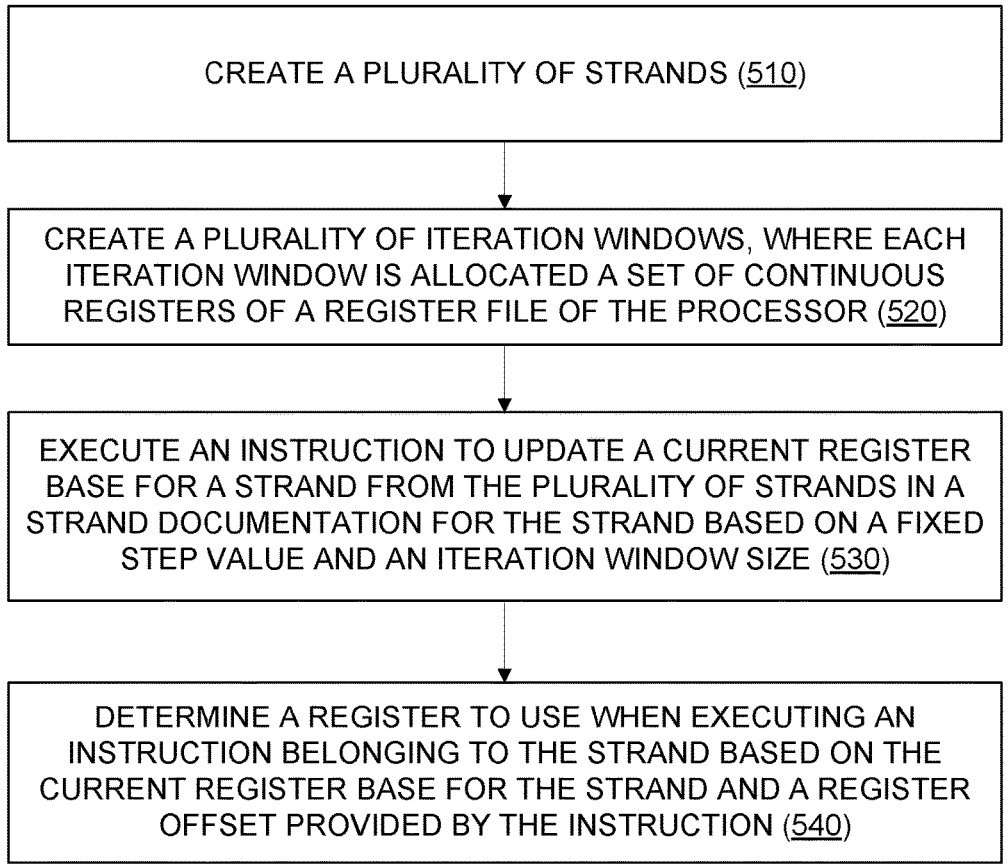
FIG. 5 is a flow diagram of a process to implement a register allocation scheme for highly parallel strand-based architectures, according to some embodiments.

FIG. 5 is a flow diagram of a process to implement a register allocation scheme for highly parallel strand-based architectures, according to some embodiments. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At block 510, a binary translator 110 creates a plurality of strands. At block 520, the binary translator 110 creates a plurality of iteration windows, where each iteration window is allocated a set of continuous registers of a register file 140 of a processor 100. At block 530, a loop accelerator 130 (and more specifically, an execution circuit 135 of a loop accelerator 130) executes an instruction (e.g., a backward branch instruction inserted by the binary translator 110) to update a current register base for a strand from the plurality of strands in a strand documentation 125 for the strand (e.g., stored in buffer 120) based on a fixed step value and an iteration window size (e.g., based on multiplying the fixed step value by the iteration window size to obtain a shift value and adding the shift value to the current register base to obtain an updated register base). At block 540, the loop accelerator 130 (e.g., an adder circuit of loop accelerator 130) determines a register to use when executing an instruction belonging to the strand based on the current register base for the strand and a register offset provided by the instruction (e.g., based on adding the register offset to the current register base to obtain the physical register identifier).

An advantage of the embodiments described herein is that they exploit the parallelism inherent in loops to increase performance (e.g., through out-of-order fetch, decode, and execution of instructions from different loop iterations executing in parallel). Another advantage of the embodiments described herein is that they facilitate power-efficient loop execution (e.g., through reuse of instructions of the loop body without repeated fetch from the instruction cache). Instructions are replayed throughout loop execution, which is made possible because each static instruction only carries the register offset (or virtual register address). The physical registers are dynamically determined based on the loop iteration being executed by the relevant strand. Yet another advantage of the embodiments described herein is that they do not require complex register renaming logic. Also, embodiments described herein do not limit the overlapping execution of loop iterations because each strand updates its register base independently from other stands according to the pattern configured by the binary translator 110. Other advantages will be apparent to one having ordinary skill in the art from the disclosure provided herein.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
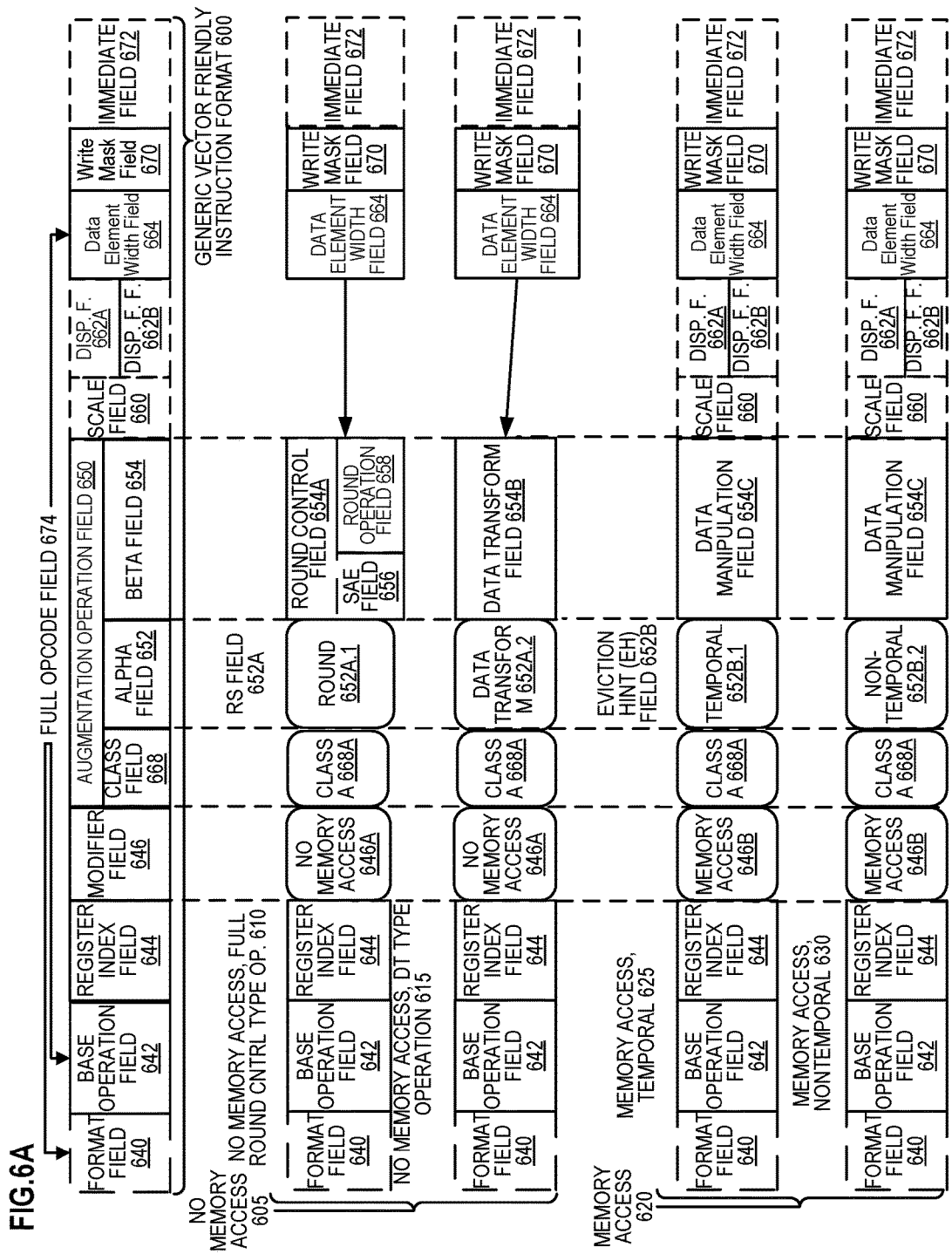
FIGS. 6A-6B are block diagrams illustrating a generic vector friendly instruction format and instruction templates thereof according to embodiments of the invention.
Figure 6B:
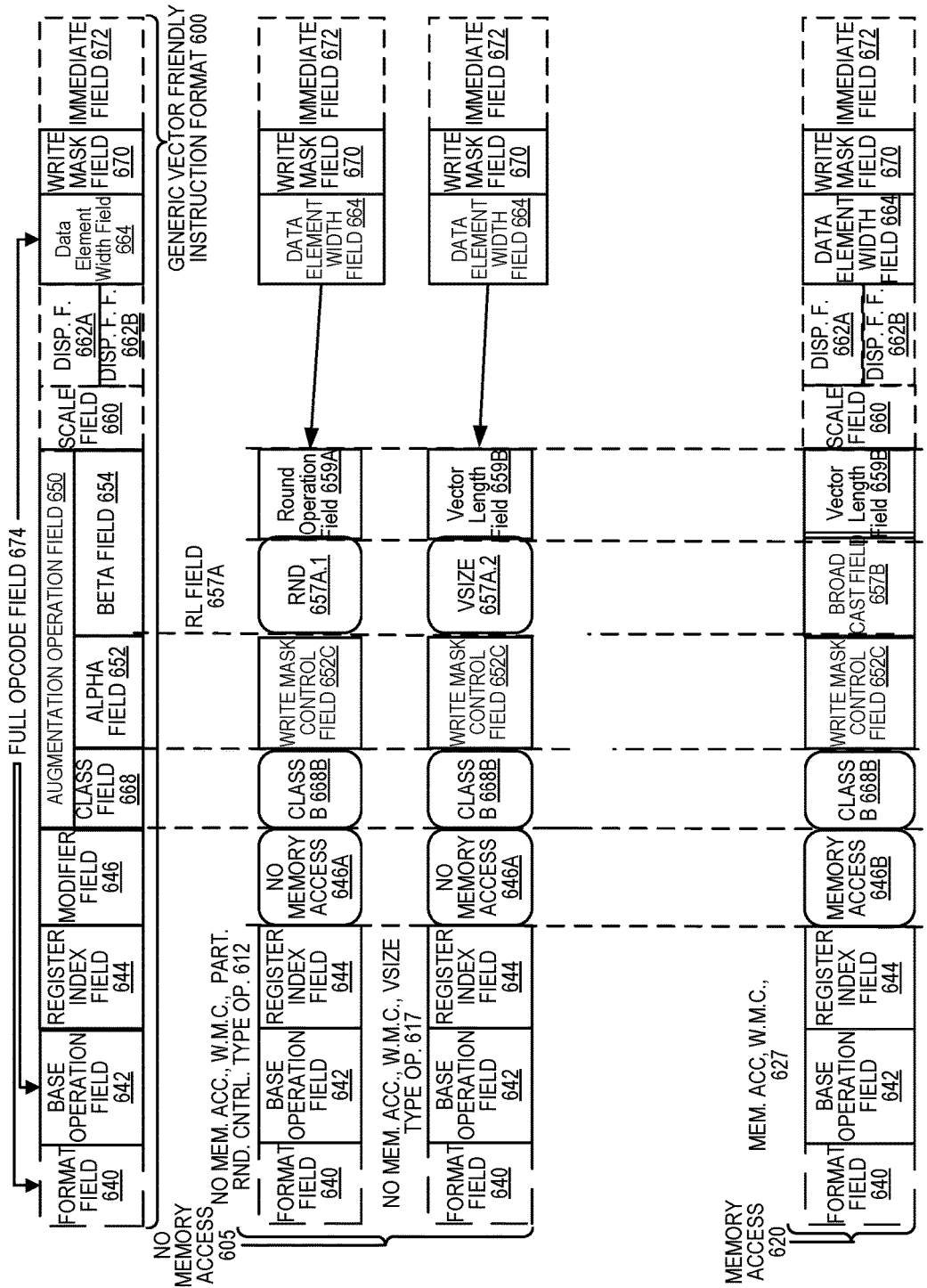

FIGS. 6A-6B are block diagrams illustrating a generic vector friendly instruction format and instruction templates thereof according to embodiments of the invention. FIG. 6A is a block diagram illustrating a generic vector friendly instruction format and class A instruction templates thereof according to embodiments of the invention; while FIG. 6B is a block diagram illustrating the generic vector friendly instruction format and class B instruction templates thereof according to embodiments of the invention. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the invention, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}*index+base$).

Displacement Field 662A—its content is used as part of memory address generation (e.g., for address generation that uses $2^{scale}*index+base+displacement$).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the invention are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that is it not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the invention the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the invention where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the invention where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7A is a block diagram illustrating an exemplary specific vector friendly instruction format according to embodiments of the invention. FIG. 7A shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7A map are illustrated.

It should be understood that although embodiments of the invention are described with reference to the specific vector friendly instruction format 700 in the context of the generic vector friendly instruction format 600 for illustrative purposes, the invention is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the invention is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits[7:0])—the first byte (EVEX Byte 0) is the format field 640 and it contains 0x62 (the unique value used for distinguishing the vector friendly instruction format in one embodiment of the invention).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]—R), EVEX.X bit field (EVEX byte 1, bit [6]—X), and 657BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.U 668 Class field (EVEX byte 2, bit [2]—U)—If EVEX.U=0, it indicates class A or EVEX.U0; if EVEX.U=1, it indicates class B or EVEX.U1.

Prefix encoding field 725 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the invention. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the invention. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
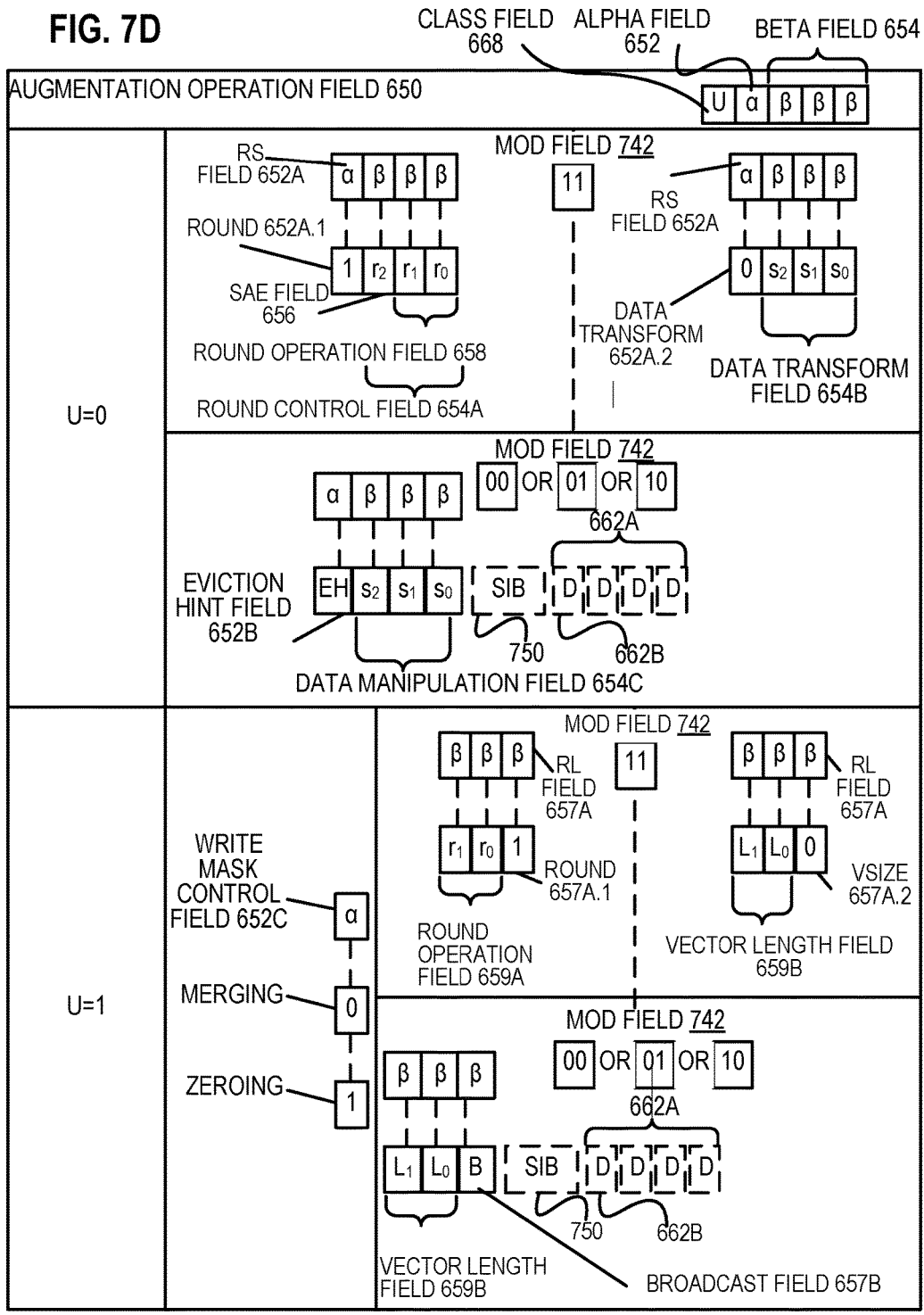
FIG. 7D is a block diagram illustrating the fields of the specific vector friendly instruction format 700 that make up the augmentation operation field 650 according to one embodiment of the invention.

FIG. 7D is a block diagram illustrating the fields of the specific vector friendly instruction format 700 that make up the augmentation operation field 650 according to one embodiment of the invention. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]—SSS) is interpreted as a three bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]—$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]—$S_{2-1}$) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Exemplary Register Architecture

Figure 8:
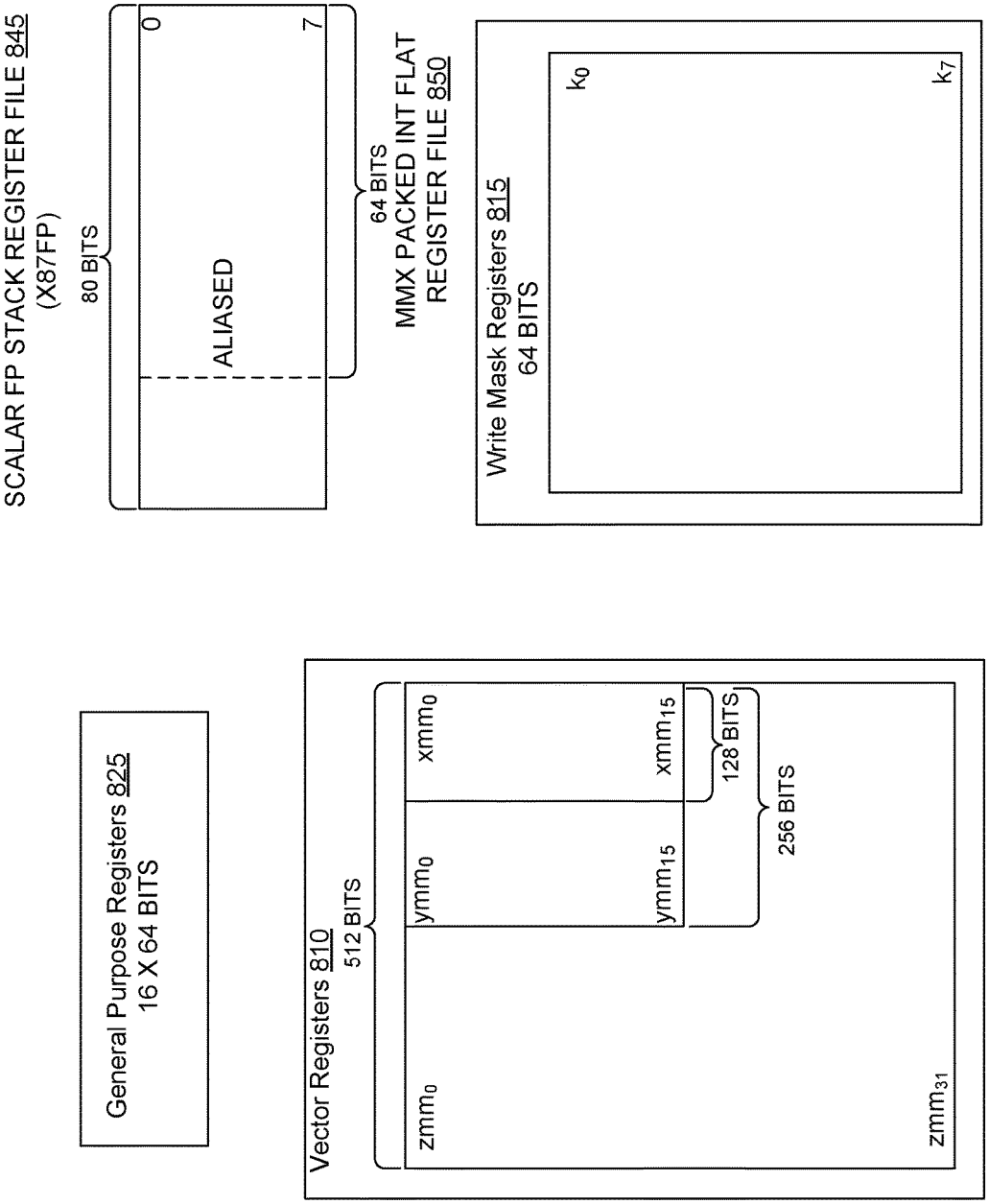
FIG. 8 is a block diagram of a register architecture 800 according to one embodiment of the invention.

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 10B:
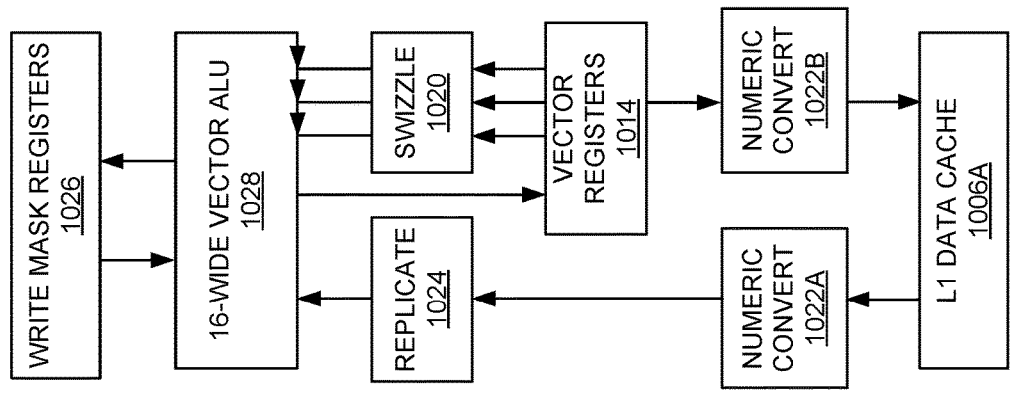
FIGS. 10A-B illustrate a block diagram of a more specific exemplary in-order core architecture, which core would be one of several logic blocks (including other cores of the same type and/or different types) in a chip.
Figure 10A:
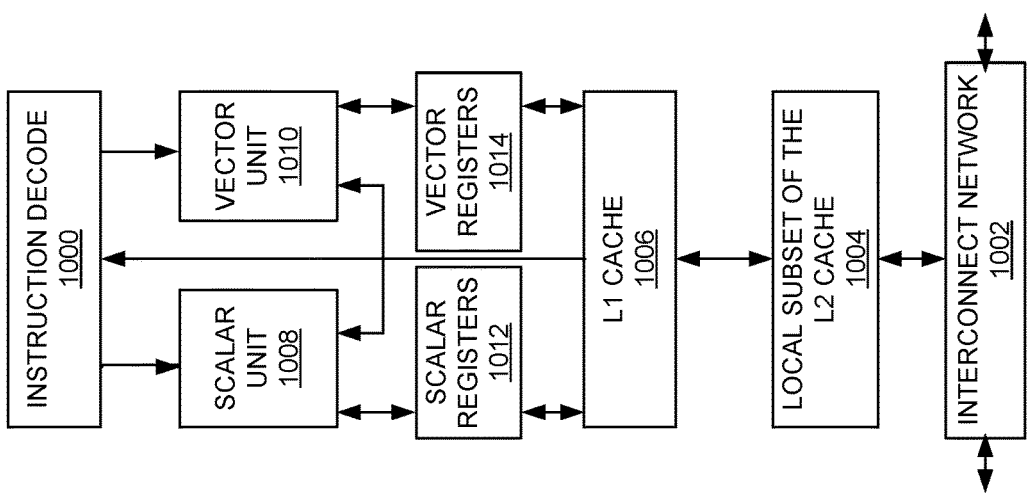

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
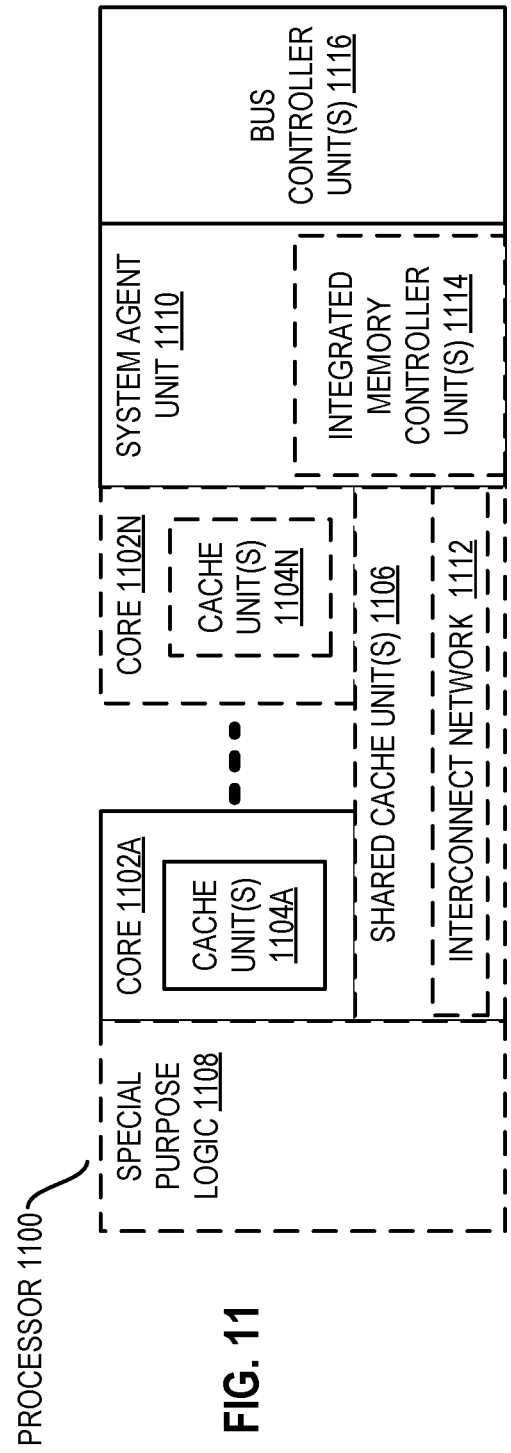
FIG. 11 is a block diagram of a processor 1100 that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108 (integrated graphics logic 1108 is an example of and is also referred to herein as special purpose logic), the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
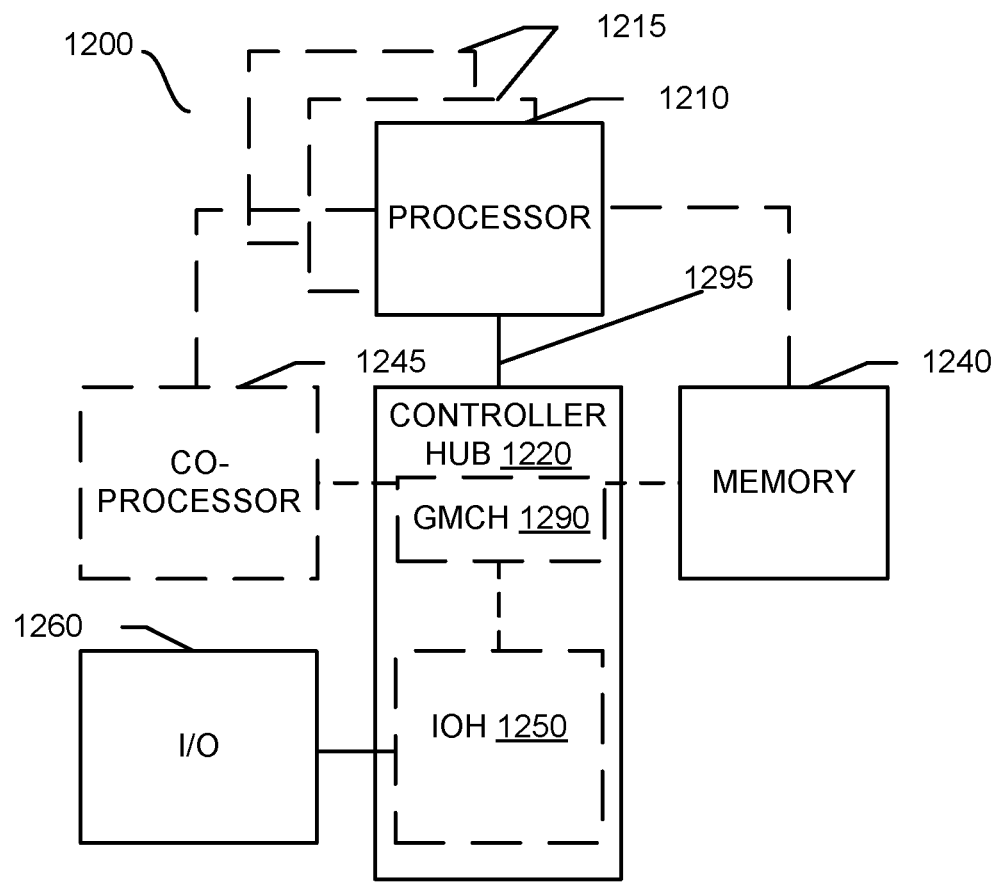
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
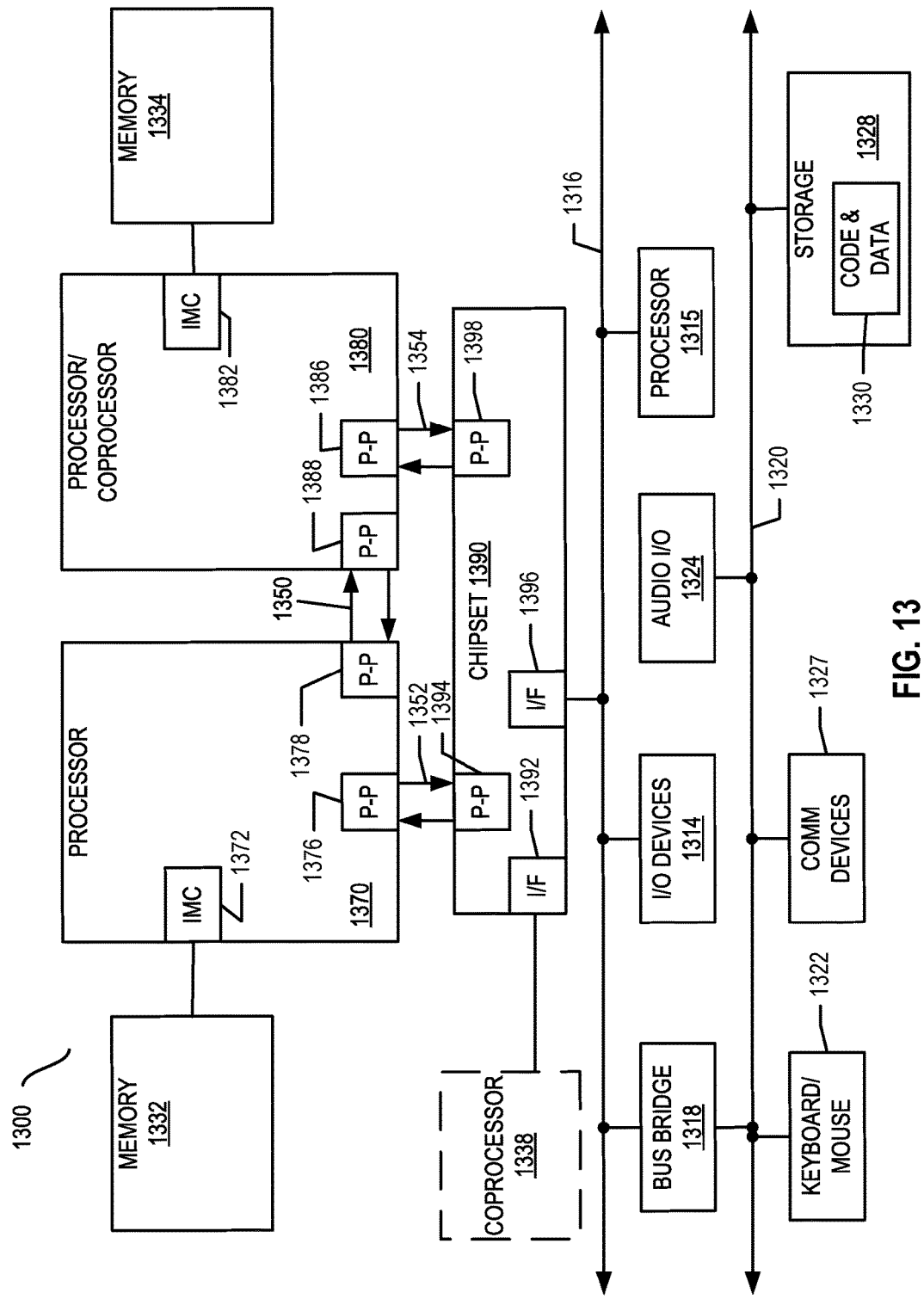

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
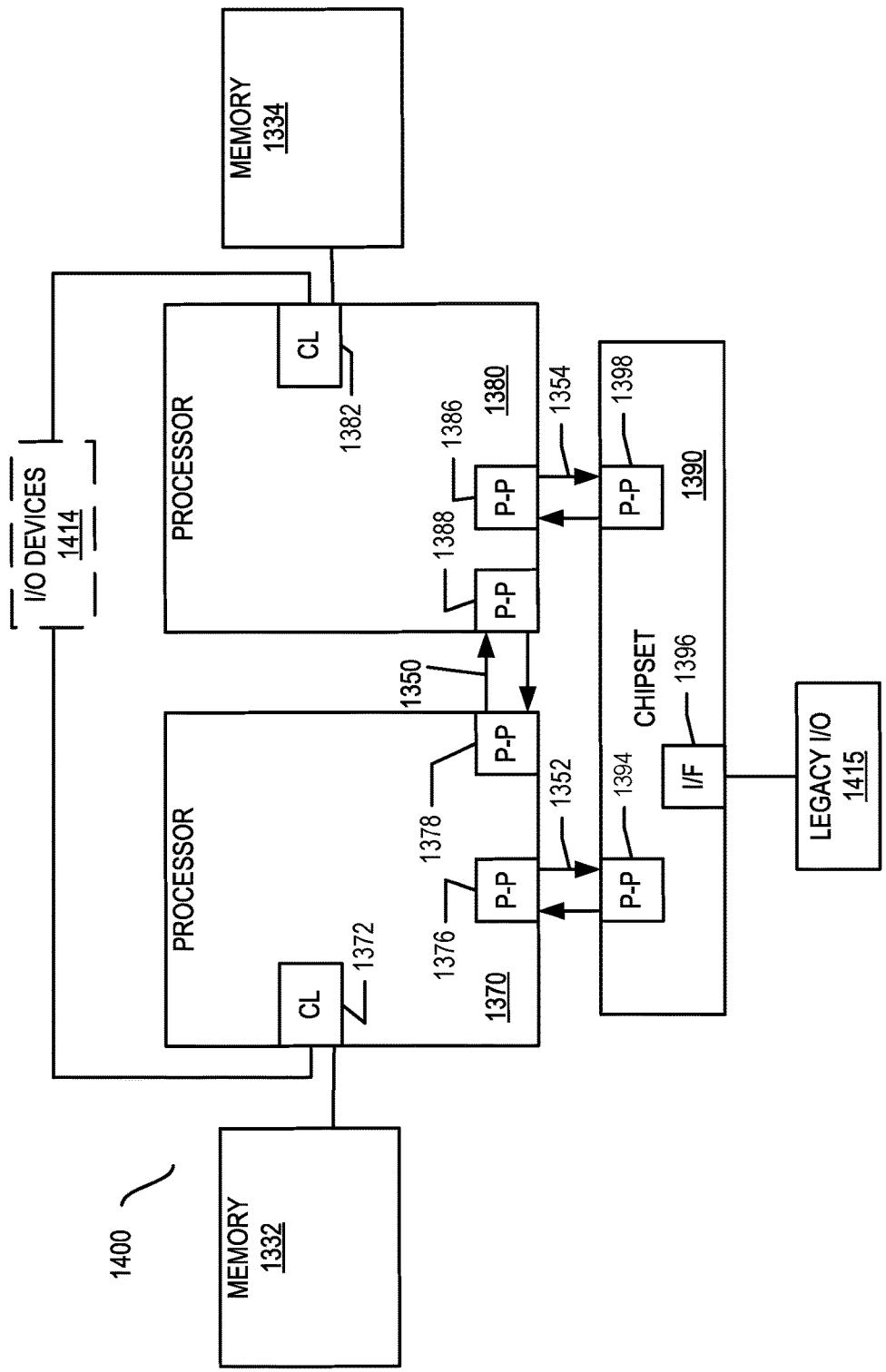

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
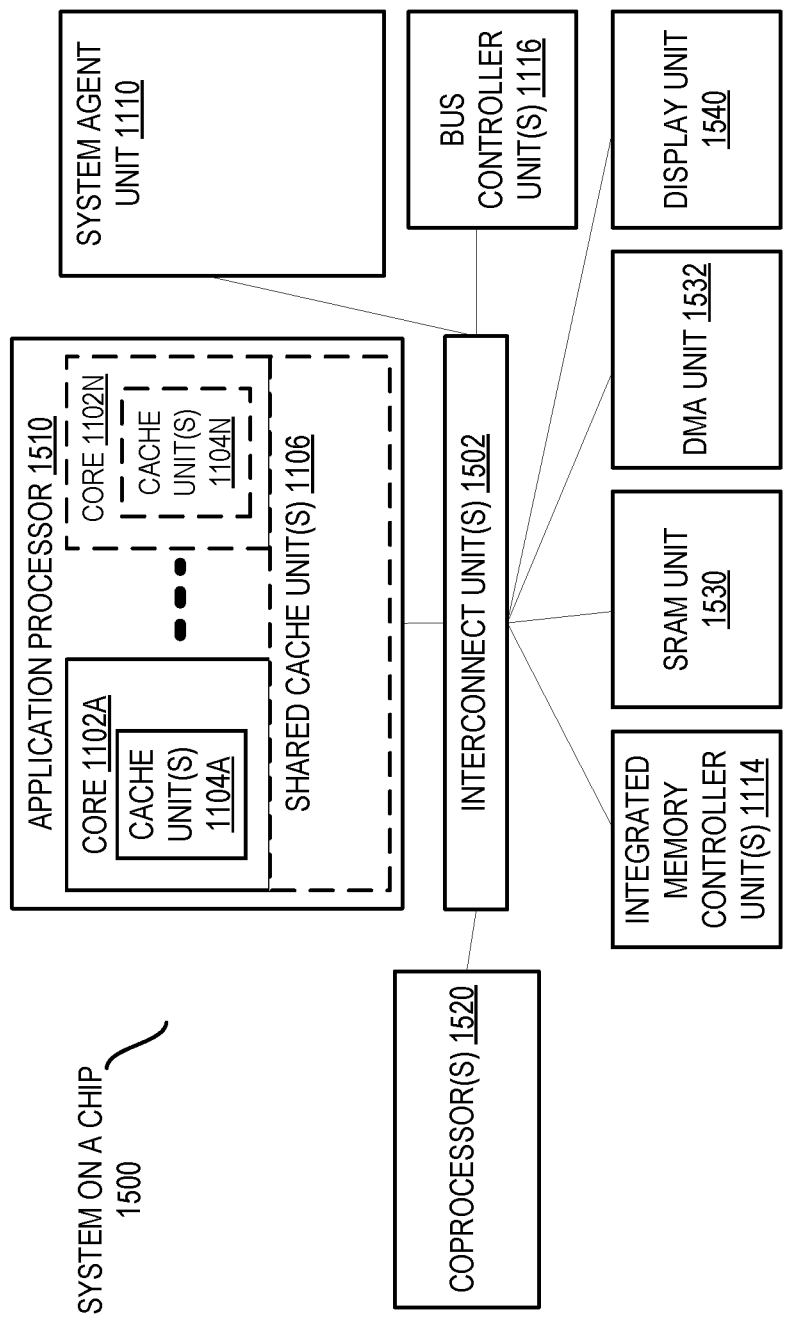

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N, which include cache units 1104A-N, and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
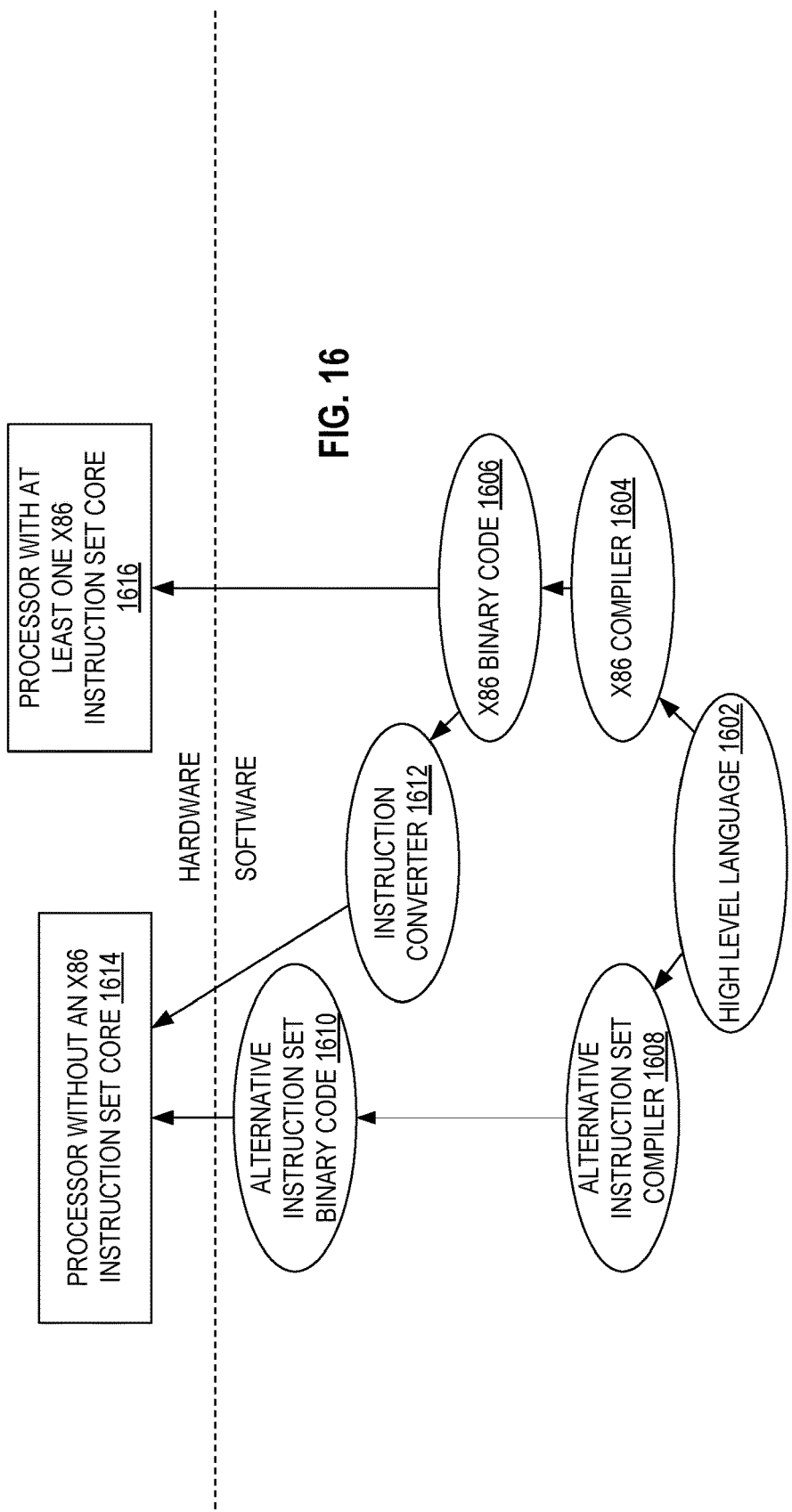
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

EXAMPLES

Example 1 is an apparatus. The apparatus includes a register file and a binary translator to create a plurality of strands and a plurality of iteration windows, where each iteration window of the plurality of iteration windows is allocated a set of continuous registers of the register file. The apparatus further includes a buffer to store strand documentation for a strand from the plurality of strands, where strand documentation for the strand is to include an indication of a current register base for the strand. The apparatus further includes an execution circuit to execute a first instruction to update the current register base for the strand in the strand documentation for the strand based on a fixed step value and an iteration window size.

Example 2 includes the substance of example 1. In this example, the apparatus further includes an adder circuit to determine a register that the execution circuit is to use when executing a second instruction belonging to the strand based on adding the current register base for the strand and a register offset provided by the second instruction.

Example 3 includes the substance of example 1. In this example, the fixed step value is provided by the first instruction, where the first instruction is a backward branch instruction (executed by the execution circuit).

Example 4 includes the substance of example 1. In this example, the iteration window size corresponds to a number of registers allocated to an iteration window.

Example 5 includes the substance of example 4. In this example, the strand documentation for the strand includes an indication of the iteration window size.

Example 6 includes the substance of example 1. In this example, the current register base for the strand is updated based on multiplying the fixed step value by the iteration window size to obtain a shift value and adding the shift value to the current register base to obtain an updated register base.

Example 7 includes the substance of example 1. In this example, the strand includes a sequence of instructions arranged by the binary translator to be executed in-order.

Example 8 includes the substance of example 1. In this example, the buffer stores strand documentation for each strand of the plurality of strands.

Example 9 is a method. The method includes creating a plurality of strands and a plurality of iteration windows, where each iteration window of the plurality of iteration windows is allocated a set of continuous registers in a register file of a processor. The method further includes updating a current register base for a strand from the plurality of strands in a strand documentation for the strand based on a fixed step value and an iteration window size.

Example 10 includes the substance of example 9. In this example, the method further includes determining a register that an execution circuit is to use when executing an instruction belonging to the strand based on adding the current register base for the strand and a register offset provided by the instruction.

Example 11 includes the substance of example 9. In this example, the fixed step value is provided by a backward branch instruction.

Example 12 includes the substance of example 9. In this example, the iteration window size corresponds to a number of registers allocated to an iteration window.

Example 13 includes the substance of example 12. In this example, the strand documentation for the strand includes an indication of the iteration window size.

Example 14 includes the substance of example 9. In this example, the current register base for the strand is updated based on multiplying the fixed step value by the iteration window size to obtain a shift value and adding the shift value to the current register base to obtain an updated register base.

Example 15 includes the substance of example 9. In this example, the strand includes a sequence of instructions arranged by a binary translator to be executed in-order.

Example 16 includes the substance of example 9. In this example, the strand documentation for the strand is stored in a buffer of a processor along with strand documentation for one or more other strands of the plurality of strands.

Example 17 is a system. The system includes a register file and a binary translator to create a plurality of strands and a plurality of iteration windows, where each iteration window of the plurality of iteration windows is allocated a set of continuous registers of the register file. The system further includes a plurality of buffers, where a buffer from the plurality of the buffers to store strand documentation for a strand from the plurality of strands, and where strand documentation for the strand is to include an indication of a current register base for the strand. The system further includes a loop accelerator that includes a plurality of execution circuits, where an execution circuit from the plurality of execution circuits to execute a first instruction to update the current register base for the strand in the strand documentation for the strand based on a fixed step value and an iteration window size.

Example 18 includes the substance of example 17. In this example, the system further includes an adder circuit to determine a register that the execution circuit is to use when executing a second instruction belonging to the strand based on adding the current register base for the strand and a register offset provided by the second instruction.

Example 19 includes the substance of example 17. In this example, the fixed step value is provided by the first instruction, where the first instruction is a backward branch instruction.

Example 20 includes the substance of example 17. In this example, the iteration window size corresponds to a number of registers allocated to an iteration window.

Example 21 includes the substance of example 20. In this example, the strand documentation for the strand includes an indication of the iteration window size.

Example 22 includes the substance of example 17. In this example, the current register base for the strand is updated based on multiplying the fixed step value by the iteration window size to obtain a shift value and adding the shift value to the current register base to obtain an updated register base.

Example 23 includes the substance of example 17. In this example, the strand includes a sequence of instructions arranged by the binary translator to be executed in-order.

Example 24 includes the substance of example 17. In this example, the plurality of buffers includes a buffer for each strand of the plurality of strands.

Example 25 is an apparatus. The apparatus includes a register file and a binary translation means to create a plurality of strands and a plurality of iteration windows, where each iteration window of the plurality of iteration windows is allocated a set of continuous registers of the register file. The apparatus further includes a storage means to store strand documentation for a strand from the plurality of strands, where strand documentation for the strand is to include an indication of a current register base for the strand. The apparatus further includes an executing means to execute a first instruction to update the current register base for the strand in the strand documentation for the strand based on a fixed step value and an iteration window size.

Example 26 includes the substance of example 25. In this example, the apparatus further includes an adding means to determine a register that the execution circuit is to use when executing a second instruction belonging to the strand based on adding the current register base for the strand and a register offset provided by the second instruction.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus comprising:
a register file;
a binary translator to create a plurality of strands and a plurality of iteration windows, wherein each iteration window of the plurality of iteration windows is allocated a set of continuous registers of the register file;
a buffer to store strand documentation for a strand from the plurality of strands, wherein the strand documentation for the strand is to include an indication of a current register base for the strand, wherein the current register base for the strand indicates a set of registers that are allocated for the strand to use during execution; and
an execution circuit communicatively coupled to the buffer and the register file, wherein the execution circuit is to execute a first instruction to update the current register base for the strand in the strand documentation for the strand based on a fixed step value and an iteration window size.

2. The apparatus of claim 1, further comprising:
an adder circuit to determine a register that the execution circuit is to use when executing a second instruction belonging to the strand based on adding the current register base for the strand and a register offset provided by the second instruction.

3. The apparatus of claim 1, wherein the fixed step value is provided by the first instruction, wherein the first instruction is a backward branch instruction.

4. The apparatus of claim 1, wherein the iteration window size corresponds to a number of registers allocated to an iteration window.

5. The apparatus of claim 4, wherein the strand documentation for the strand includes an indication of the iteration window size.

6. The apparatus of claim 1, wherein the current register base for the strand is updated based on multiplying the fixed step value by the iteration window size to obtain a shift value and adding the shift value to the current register base to obtain an updated register base.

7. The apparatus of claim 1, wherein the strand includes a sequence of instructions arranged by the binary translator to be executed in-order.

8. The apparatus of claim 1, wherein the buffer stores strand documentation for each strand of the plurality of strands.

9. A method by a computing system, the method comprising:
creating, by a binary translator of the computing system, a plurality of strands and a plurality of iteration windows, wherein each iteration window of the plurality of iteration windows is allocated a set of continuous registers in a register file of a processor; and
executing, by an execution circuit of the computing system, an instruction to update a current register base for a strand from the plurality of strands in a strand documentation for the strand based on a fixed step value and an iteration window size, wherein the current register base for the strand indicates a set of registers that are allocated for the strand to use during execution.

10. The method of claim 9, further comprising:
determining a register that an execution circuit is to use when executing an instruction belonging to the strand based on adding the current register base for the strand and a register offset provided by the instruction belonging to the strand.

11. The method of claim 9, wherein the fixed step value is provided by the instruction, and wherein the instruction is a backward branch instruction.

12. The method of claim 9, wherein the iteration window size corresponds to a number of registers allocated to an iteration window.

13. The method of claim 12, wherein the strand documentation for the strand includes an indication of the iteration window size.

14. The method of claim 9, wherein the current register base for the strand is updated based on multiplying the fixed step value by the iteration window size to obtain a shift value and adding the shift value to the current register base to obtain an updated register base.

15. The method of claim 9, wherein the strand includes a sequence of instructions arranged by a binary translator to be executed in-order.

16. The method of claim 9, wherein the strand documentation for the strand is stored in a buffer of a processor along with strand documentation for one or more other strands of the plurality of strands.

17. A system comprising:
a register file;
a binary translator to create a plurality of strands and a plurality of iteration windows, wherein each iteration window of the plurality of iteration windows is allocated a set of continuous registers of the register file;
a plurality of buffers, wherein a buffer from the plurality of the buffers is to store strand documentation for a strand from the plurality of strands, wherein the strand documentation for the strand is to include an indication of a current register base for the strand, wherein the current register base for the strand indicates a set of registers that are allocated for the strand to use during execution; and
a loop accelerator that includes a plurality of execution circuits, wherein the loop accelerator is communicatively coupled to the plurality of buffers and the register file, and wherein an execution circuit from the plurality of execution circuits is to execute a first instruction to update the current register base for the strand in the strand documentation for the strand based on a fixed step value and an iteration window size.

18. The system of claim 17, further comprising:
an adder circuit to determine a register that the execution circuit is to use when executing a second instruction belonging to the strand based on adding the current register base for the strand and a register offset provided by the second instruction.

19. The system of claim 17, wherein the fixed step value is provided by the first instruction, wherein the first instruction is a backward branch instruction.

20. The system of claim 17, wherein the iteration window size corresponds to a number of registers allocated to an iteration window.

21. The system of claim 20, wherein the strand documentation for the strand includes an indication of the iteration window size.

22. The system of claim 17, wherein the current register base for the strand is updated based on multiplying the fixed step value by the iteration window size to obtain a shift value and adding the shift value to the current register base to obtain an updated register base.

* * * * *